2,897,122
ENTERIC COATED PRODUCT

John F. Millar, Valois, Quebec, Canada, assignor to Charles E. Frosst & Co., Montreal, Quebec, Canada, a corporation of the Province of Quebec No Drawing. Application September 30, 1957
Serial No. 686,863

Claims priority, application Canada October 4, 1956

4 Claims. (Cl. 167—82)

The present invention relates to new and useful improvements in pharmaceutical preparations and, more particularly, to enteric coated solid dosage units.

PRIOR ART

It has been accepted practice in the compounding of pharmaceutical tablets to provide certain types of tablets with what has been commonly referred to as an enteric coating. The enteric coating is one which will resist the action of the gastric juices in the stomach and will not dissolve therein or be otherwise affected thereby so that the drug which is incorporated in the tablet will pass through the stomach and into the intestine. The so-called enteric coating is of such a nature that it will be dissolved very readily in the intestinal fluids, so that the drug which has been inclosed in the enteric coating will become effective in the intestinal tract rather than in the stomach. The medical profession has, as a matter of fact, developed a number of types of treatments in which enteric coatings are considered to be extremely useful.

In vitro studies that have been made on coating materials have shown that cellulose acetate phthalate is one of the most efficient materials known for enteric coatings of this type.

This material while recognized as highly efficient for an enteric coating, has serious limitations in its practical applications on a manufacturing scale. A noted disadvantage is that this material must be applied in highly diluted solution and many separate applications are required to build up a satisfactory dry coating of sufficient thickness. It is also known that it is difficult to obtain smooth coatings. A further disadvantage in the use of cellulose acetate phthalate is the fact that the solvents for this substance are either those of a hazardous and explosive nature, for example, lower ketones, or have highly toxic vapours, for example, mixtures of methyl alcohol and ethylene dichloride.

APPLICANT'S DEVELOPMENT

In accordance with the present invention, there is now provided an improved enteric coating material and a solid medicinal oral dosage unit surrounded by said enteric coating material.

The enteric coating material of the present invention is a phthalic acid ester of a partially esterified polyvinyl alcohol in which the hydroxyl groups of the vinyl groups are partly esterified by phtalic acid, partly acetylated, and partly unreplaced. The polyvinyl acetate phthalate of the present invention is characterized by having a degree of polymerization of from 600 to 800, a phthalyl content within the range of from 60 to 70%, an acetyl content within the range of from 1.6 to 6.0%, and is obtained from a polyvinyl acetate, a molecular weight within the range of from 25,000 to 40,000 which corresponds to a degree of polymerization of from 600 to 800. The polyvinyl acetate phthalate of the present invention is further characterized by its substantial insolubility in an acid medium such as the stomach juices, substantial solubility in a mild alkaline medium such as the intestinal fluids and complete solubility in a 9 to 95% ethyl alcohol solution. It is also characterized by its low viscosity as a 30% solution in alcohol. As an example of polyvinyl acetate phthalate suitable for use as an enteric material, there may be mentioned a polyvinyl acetate phthalate having a degree of polymerization of about 750, a phthalyl content of about 65% and an acetyl content of about 4.8%.

A further aspect of the present invention is in providing a solid medicinal oral dosage unit containing at least one solid medicinal agent which comprises a shaped core containing a medicinal agent which is surrounded by an enteric film or layer of the polyvinyl acetate phthalate of the present invention.

The enteric coating material of the present invention can be prepared by treating a partially hydrolyzed polyvinyl alcohol with a phthalic anhydride, in an inert solvent at a moderately elevated temperature. The reaction mixture is then poured into an aqueous mineral acid solution to precipitate the desired polyvinyl acetate phthalate.

The partially hydrolyzed polyvinyl alcohol suitable as starting material is one which has a degree of polymerization within the range of 600 to 800 which corresponds to a molecular weight of from 25,000 to 40,000, an acetyl content of from 5 to 15%, a viscosity of from 4 to 6 cps. As an example of a preferred polyvinyl acetate there may be mentioned a product manufactured and sold under the trademark "Elvanol" (51–05) by E. I. du Pont de Nemours & Co. Inc., Wilmington, Del., U.S.A., which has a degree of polymerization of about 750, an average molecular weight of 33,000, a viscosity of from 4 to 6 cps. when measured in a 4% water solution at 20° C., and which is 88% hydrolyzed and which has an acetyl content of 12%.

The reaction is carried out in an inert solvent. As an example of suitable inert solvents, there may be mentioned pyridine, picoline or methyl ethyl ketone.

The reaction is carried out at reflux for a period of from one to three hours, depending on the reactants used.

The use of the polyvinyl acetate phthalate of the present invention as an enteric coating has many advantages over prior art enteric coatings. It is quite insoluble in aqueous fluids below pH 3.5 and shows increasing solubility up to pH 6 and is readily soluble in simulated intestinal juice containing pancreatin having a pH of 7 to 7.5.

The new enteric coating material is particularly suitable for obtaining smooth coatings and avoids the use of hazardous solvents, and furthermore, is capable of forming concentrated solutions of low viscosity thus decreasing the amount of solvent and the number of coatings normally required with prior art enteric coating materials.

COATING PROCEDURE

The tablets are placed in the standard rotating coating pan used in the industry and the coating material is applied in liquid form as a solution in a suitable non hazardous solvent, for example, ethanol. The coating solution is applied in several increments with the volume used each time being just that sufficient to moisten the surface of all the tablets in the pan. A stream of warm air is blown on the rotating tablets to evaporate the solvent and as the coating dries to a tacky stage a suitable dusting powder is added to prevent the tablets adhering to each other.

This procedure is repeated until a sufficient thickness of coating material has been built up to completely seal the table surface and to resist penetration by gastric secretions for a period of 2 to 6 hours.

The solution used can have a concentration of 20 to 40% w./v. with a preferred concentration of about 30% w./v. As a solvent there may be used ketones, lower alcohols or mixture of alcohols and chlorinated solvents. Preferably, 95% ethanol is used. The number of coatings will vary with the concentration of the enteric coating material. For practical purposes 6 to 8 coatings are applied when using 30% w./v. solution.

The enteric coating of the present invention can be used for coating any pharmaceutical tablet to which it is desired to confer enteric properties.

EXAMPLES

The present invention will be more fully understood by referring to the examples which are given to illustrate rather than limit the scope of the invention.

Example I

PREPARATION OF POLYVINYL ACETATE PHTHALATE

To a solution of 9.5 g. phthalic anhydride in 25 cc. of pyridine was added to 5.0 g. of polyvinyl acetate manufactured and sold by E. I. du Pont de Nemours & Co. Inc., and sold under the trademark "Elvanol 51–05" (12% acetyl, viscosity 4 to 6 cps., molecular weight approximately 33,000), and heated at 100 to 110° C. for 1 hour. After dilution with 100 cc. of water, the clear solution was precipitated by running into a solution of 200 cc. of water and 25 cc. of concentrated hydrochloric acid with stirring. The product was filtered, washed with water, dried at room temperature and milled to an off-white powder. Yield 12.4 g. Phthalyl content 65%. Acetyl content 4.8%. A 25% solution suitable for coating was made by dissolving in denatured ethyl alcohol (90 to 95%).

Example II 80,000 tablets weighing 0.725 gm. each, and containing 150 mg. of brewer's yeast concentrate, 5 mg. of thiamine HCl, 3 mg. of riboflavin (vitamin $B_2$), 12.5 mg. of niacinamide, 1 mg. of pyridoxine HCl, 1.5 mcgm. of vitamin $B_{12}$, 35 mg. of vitamin C (ascorbic acid) and 500 int. units of vitamin D, were placed in a rotating coating pan and treated with a solution containing 30% w./v. of polyvinyl acetate phthalate, as prepared in Example I, dissolved in 90% of denatured alcohol.

The solution was added in increments of 1200 ml. and the tables dusted between applications with talc to prevent sticking. The drying time between coats was approximately 15 minutes and eight coats were applied. The total coating time was about 2½ hours and the tablets received a smooth uniform coating of about 35 mgm. of coating material per tablet. A standard sugar coating then was applied over the enteric layer.

Disintegrating tests on these tablets showed that they resist the action of simulated gastric juice (pH 1.5), for at least 3 hours and that they disintegrate in simulated intestinal juice (pH 7.5) within 20 minutes.

Some tablets which had been removed from the coating pan after 6 applications of the enteric coating were also examined for disintegrating properties. It was found that they resist the simulated gastric juice for 2½ hours and disintegrate in the simulated intestinal juice in 15 minutes. Thus a definite proportionality exists between the amount of enteric resin applied and the disintegration time.

Example III

A batch of 160,000 tablets weighing 0.25 gm. each and containing 325 mg. of ferrous sulphate B.P., 325 mg. of edible bone flour, 1500 int. units of vitamin A acetate, 500 int. units of vitamin D, 1 mg. of vitamin $B_1$, 1 mg. of riboflavin, 5 mg. of niacinamide, 30 mg. of vitamin C (ascorbic acid), and 0.2 mg. of sodium iodide was placed in a rotating coating pan and treated with a solution containing 30% w./v. of polyvinyl acetate phthalate as prepared in Example I dissolved in 95% denatured alcohol SDAG–1G.

The coating process was as follows: 750 ml. of coating solution was poured over the tumbling tablets. After the solution was thoroughly dispersed and at the instant the tablets started to adhere to the pan 1,100 gm. of talc was dusted on the tablets to prevent sticking. About 30 seconds later cold air was blown over the tablets to remove excess talc and complete the evaporation of the alcohol. The pan was rotated for another minute and then stopped. For the next fifteen minutes cold air was continuously blown over the tablets and the pan was rotated one half turn every 2 or 3 minutes.

This procedure was then repeated seven times to build up the coating layer. The tablets were dried overnight and the following day a sugar coating was applied using standard procedures.

Disintegration tests on these tablets showed that they resist the action of simulated gastric juice (pH 1.5), for at least 3 hours and that they disintegrate in simulated intestinal juice (pH 7.5) within 20 minutes.

I claim:

1. A solid medicinal oral dosage unit containing at least one medicinal agent, comprising a shaped core containing a medicinal agent surrounded by an enteric film or layer of a partially esterified polyvinyl alcohol in which the hydroxyl groups of the vinyl groups are partly esterified by phthalic acid, partly acetylated, and partly unreplaced, said partially esterified polyvinyl alcohol having a degree of polymerization of from 600 to 800, a phthalyl content within the range of from 60 to 70%, an acetyl content of from 1.6 to 6.0%, said enteric coating being substantially insoluble in the stomach juices, substantially soluble in the intestinal fluids and soluble in 90–95% ethyl alcohol.

2. A solid medicinal oral dosage unit containing at least one medicinal agent, comprising a shaped core containing a medicinal agent surrounded by an enteric film or layer of a partially esterified polyvinyl alcohol in which the hydroxyl groups of the vinyl groups are partly esterified by phthalic acid, partly acetylated, and partly unreplaced, said partially esterified polyvinyl alcohol having a degree of polymerization of about 750, a phthalyl content of about 65%, an acetyl content of about 4.8%, said enteric coating being substantially insoluble in the stomach juices, substantially soluble in the intestinal fluids medium, and soluble in 90–95% ethyl alcohol.

3. A method of preparing a solid enteric coated medicinal dosage unit, comprising applying to a solid shaped dosage unit containing at least one medicament, a layer of an enteric material of a partially esterified polyvinyl alcohol in which the hydroxyl groups of the vinyl groups are partly esterified by phthalic acid, partly acetylated, and partly unreplaced, said partially esterified polyvinyl alcohol having a degree of polymerization of 600 to 800, a phthalyl content within the range of from 60 to 70% and an acetyl content of from 1.6 to 6.0%, said enteric material being applied from an organic solvent.

4. A method of preparing a solid enteric coated medicinal dosage unit, comprising forming a solid shaped dosage unit containing at least one medicament and applying thereto a layer of an enteric material of a partially esterified polyvinyl alcohol in which the hydroxyl groups of the vinyl groups are partly esterified by phthalic acid, partly acetylated, and partly unreplaced, said partially esterified polyvinyl alcohol having a degree of polymerization of about 750, a phthalyl content of about 65% and an acetyl content of about 4.8, said material being applied from an organic solvent.

References Cited in the file of this patent

UNITED STATES PATENTS 2,455,790     Malm                Dec. 7, 1948

FOREIGN PATENTS 724,544     Great Britain         Dec. 30, 1955